US007018149B2

(12) United States Patent
Freese et al.

(10) Patent No.: US 7,018,149 B2
(45) Date of Patent: Mar. 28, 2006

(54) PLUNGE-TYPE ROUTER HAVING IMPROVED PLUNGE RETURN CAPABILITY

(75) Inventors: John Freese, Evanston, IL (US); Kristopher Baker, Rolling Meadows, IL (US)

(73) Assignee: Credo Technology Corporation, Broadview, IL (US)

( * ) Notice: Subject to any disclaimer, the term of this patent is extended or adjusted under 35 U.S.C. 154(b) by 160 days.

(21) Appl. No.: 10/798,057

(22) Filed: Mar. 11, 2004

(65) Prior Publication Data

US 2005/0201839 A1 Sep. 15, 2005

(51) Int. Cl.
*B23C 1/20* (2006.01)

(52) U.S. Cl. ................................. 409/182; 144/136.95

(58) Field of Classification Search ................ 409/182, 409/181, 180, 179, 178, 175; 144/154.5, 144/136.95
See application file for complete search history.

(56) References Cited

U.S. PATENT DOCUMENTS 16,972 A 4/1857 Foster et al.
274,715 A 3/1883 Buckley
2,091,842 A 8/1937 West
4,938,264 A 7/1990 Ferenczffy
5,207,253 A * 5/1993 Hoshino et al. ............ 409/182
5,590,988 A * 1/1997 Rusconi ...................... 409/182
5,671,789 A * 9/1997 Stolzer et al. ........... 144/154.5
6,419,429 B1 * 7/2002 Long et al. ................. 409/182
6,474,378 B1 * 11/2002 Ryan et al. ................. 409/182

* cited by examiner

*Primary Examiner*—Boyer D. Ashley
*Assistant Examiner*—Dana Ross
(74) *Attorney, Agent, or Firm*—Greer, Burns & Crain, Ltd.

(57) ABSTRACT

A preferred embodiment router is disclosed having a housing which supports a motor wherein the housing is vertically movable along a pair of spaced vertical guide posts of a base structure and wherein the router includes a flexible baffle which can vertically expand and contract as the housing is moved relative to the base structure and wherein at least one post has a coil spring located within the baffle which is configured to bias the housing away from the base structure, with the coil spring having a generally hourglass shaped configuration. The configuration has outer end portions with larger coil diameters, both of which transition to a center portion with a smaller coil diameter. The hourglass configured coil minimizes the possibility of the coil buckling which could result in a loss of spring force as well as a distortion of the shape of the baffle. Also, the amount of travel that is permitted by the hourglass spring is larger than would be achieved by a comparable uniform coil diameter spring made from the same material, because a number of coils can be telescoped together to produce a smaller compressed or solid height of the spring.

14 Claims, 6 Drawing Sheets

PLUNGE-TYPE ROUTER HAVING IMPROVED PLUNGE RETURN CAPABILITY

BACKGROUND OF THE INVENTION

The present invention generally relates to hand held power tools and more particularly to routers.

Craftsmen and artisans have been using routers for decades to perform many woodworking tasks, including cutting decorative shapes and edges in wood and other suitable materials. While fixed base routers, i.e., ones where the housing is fixed or locked in a position relative to the base after the depth of cut of the tool bit has been set, are often used by professional artisans, many router users prefer plunge type routers which have a housing that is rapidly movable relative to a base with the amount of vertical movement being determined by a depth limiting mechanism.

Plunge routers generally have a housing in which a motor is located, although in certain types of routers a removable motor assembly may be carried by a housing. In this type of situation, generally known in the art as a hybrid router, the motor assembly can be removed from the housing and placed in a fixed base housing so that it can be operated in that manner. If the motor assembly is mounted into a plunge type router housing or if the router is a dedicated plunge-type router, the housing is generally mounted on a base structure of the type that typically has a pair of spaced vertical guide posts along which the housing can be vertically moved. During use, an artisan may press down on the housing, typically by pressing down on handles that extend from opposite sides of the housing or motor assembly so that as the housing is pressed downwardly toward the base structure, the router bit penetrates into a work piece that is to be cut.

An adjustable depth of cut mechanism is nearly always provided to control the depth in which the router bit can penetrate the work piece to produce the desired cutting operation. Generally, when the artisan presses down on the handles to have the router bit penetrate the work piece, a handle or lever mechanism can be set to hold the router at the desired position during use. When the router bit is to be removed from the work piece, the lever can be released and springs located in the router around the posts act to push the housing upwardly away from the base structure. Typically, the springs are coil springs that surround each of the posts and bear against the base structure as well as the housing and provide a biasing force tending to separate the two components. It is also typical for the springs to be housed in generally cylindrical or oblong accordion-like baffles that hide the springs from view and to provide a barrier for dust and other debris from coming into contact with the post surface and the interface between the post and openings in the housing in which sliding movement of the housing on the post occurs.

Because there are two posts on which the housing must slide, it is not unusual for a particular router design to exhibit a tendency for the housing to bind during sliding movement and one of the solutions to minimize such binding is to have a single spring on one of the posts or to have springs on both posts with the spring force of one of the springs being greater than the other.

SUMMARY OF THE INVENTION

A preferred embodiment of the present invention is directed to a router having a housing which supports a motor wherein the housing is vertically movable along a pair of spaced vertical guide posts of a base structure and wherein the router includes a flexible baffle which can vertically expand and contract as the housing is moved relative to the base structure and wherein at least one post has a coil spring located within the baffle which is configured to bias the housing away from the base structure, with the coil spring having a generally hourglass shaped configuration. The configuration has outer end portions with larger coil diameters, both of which transition to a center portion with a smaller coil diameter. The hourglass configured coil minimizes the possibility of the coil buckling which could result in a loss of spring force as well as a distortion of the shape of the baffle. Also, the amount of travel that is permitted by the hourglass spring is larger than would be achieved by a comparable uniform coil diameter spring made from the same material, because a number of coils can be telescoped together to produce a smaller compressed or solid height of the spring.

DETAILED DESCRIPTION OF THE PREFERRED EMBODIMENT

Figure 1:
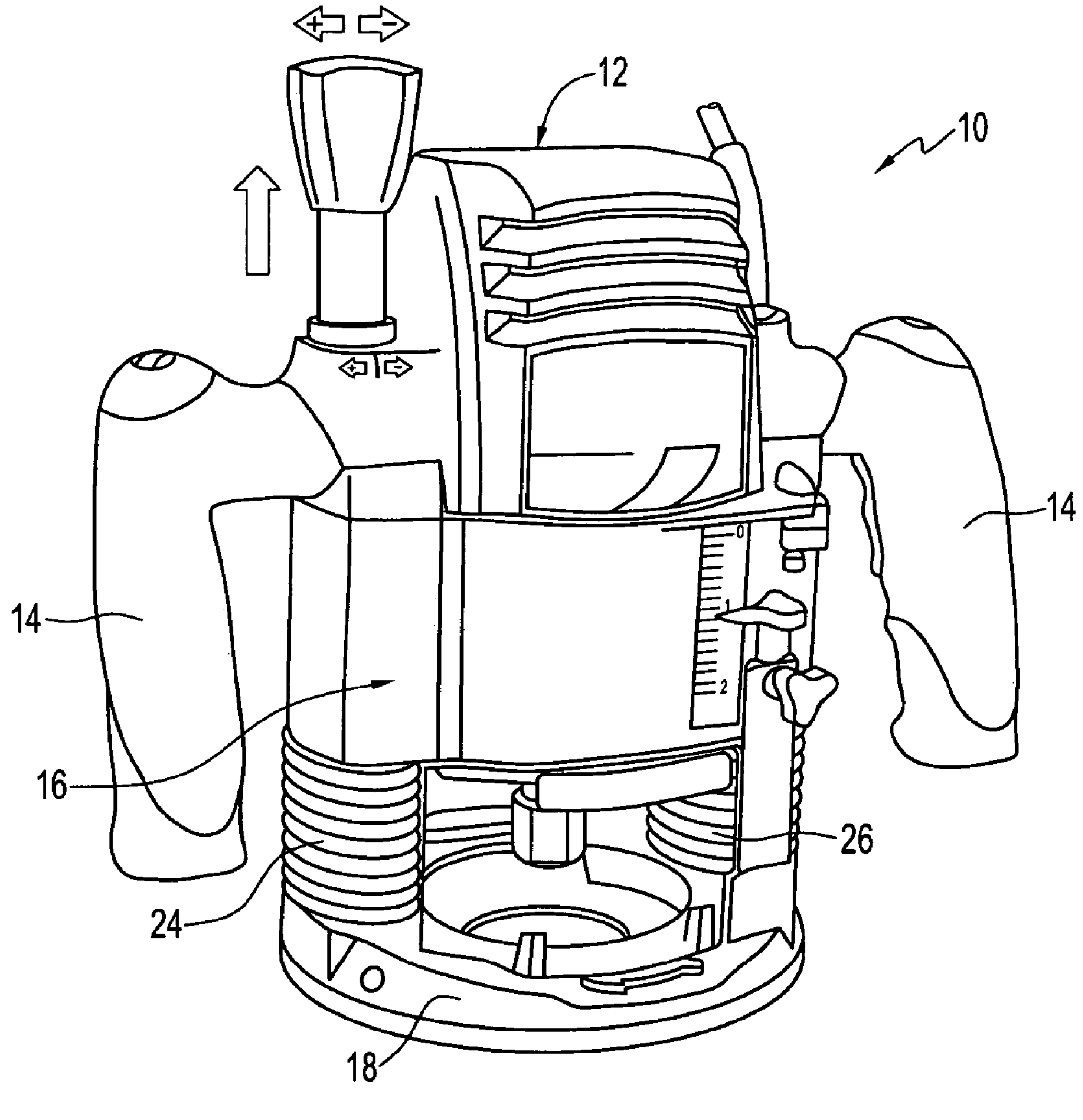
FIG. 1 is a perspective view of a router in which the preferred embodiment of the present invention may be employed.

A representative router in which the present invention may be implemented is shown generally at 10 in FIG. 1. The router 10 has a removable motor assembly 12 with handles 14, the assembly 12 being installed in a housing 16 that is vertically adjustable relative to a base structure 18 having a pair of posts 20, 22 (see FIG. 2), which are located inside respective baffles 24 and 26. The housing 16 can be moved toward and away from the base structure by sliding along the posts 20 and 22 when manipulated by an operator. In this regard, the operation of the router shown in FIG. 1 is described in detail in patent application entitled "A Hybrid Router", by John B. Freese, Robert H. Bruno and Bjorn J. Gunderson, Ser. No. 10/615,726, filed Jul. 9, 2003, which is incorporated by reference herein. As is described in that patent application, a depth of cut adjustment control mechanism is provided to limit the depth of cut of a router bit that is installed in the router and a locking mechanism is also disclosed for holding the bit in position during a routing operation without having to provide a constant downward force on the housing.

Figure 2:
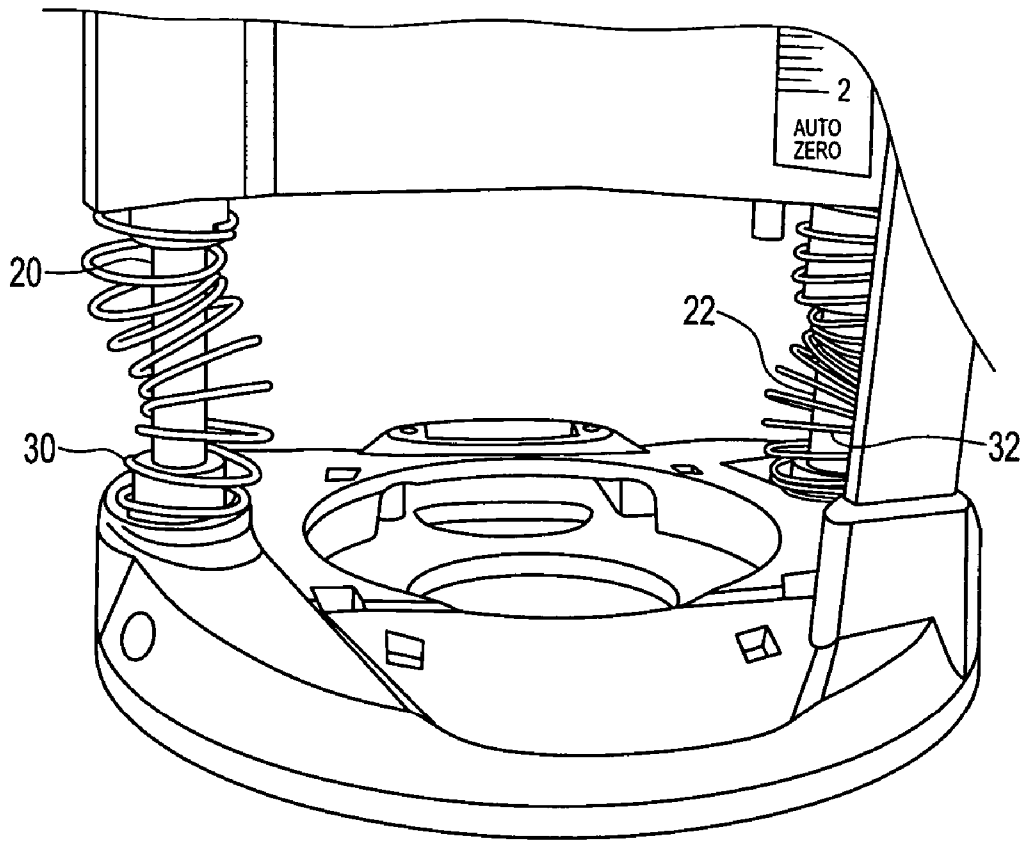
FIG. 2 (PRIOR ART)
FIG. 2 is a perspective view of a representative router which utilizes a prior art uniform coil diameter spring surrounding the post of a base structure in which a housing is vertically movable and particularly showing a baffle removed to illustrate the deformation of a uniform coil diameter spring.
Figure 3:
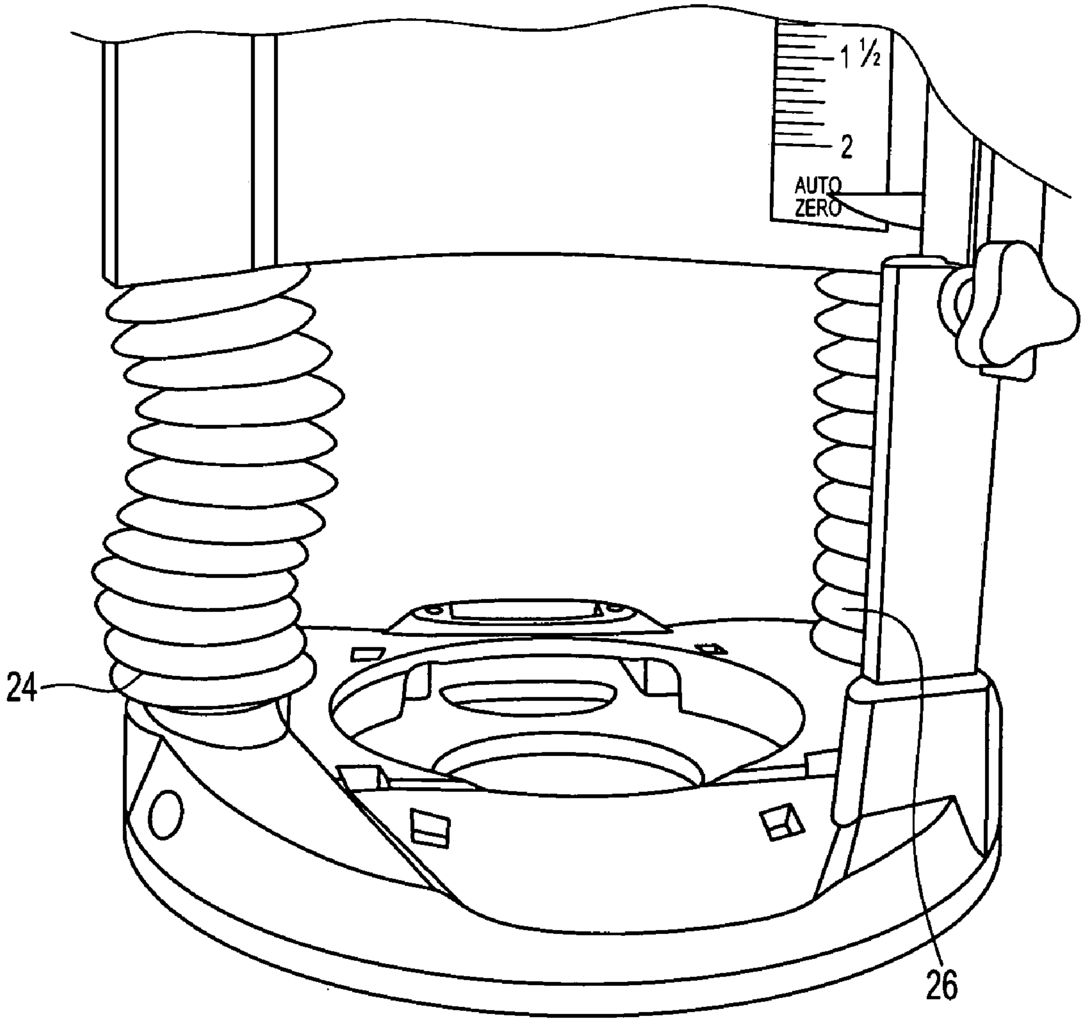
FIG. 3 (PRIOR ART)
FIG. 3 is a perspective view of a representative router which utilizes a prior art uniform coil diameter spring surrounding the post of a base structure in which a housing is vertically movable and particularly showing deformation of the shape of a baffle.

As is shown in FIG. 2, a uniform coil diameter spring 30 is shown to be installed around the guide post 20 and another uniform coil diameter coil 32 is shown installed around the post 22. As is readily apparent, the diameter of the wire material of the coil 30 is larger than the diameter of the material used for the coil 32. This is because it was desired to have a stronger spring force exerted by the spring 30 than spring 32 to overcome a tendency for the housing to bind during a plunge operation. The spring 30 is shown in FIG. 2 to be extensively buckled and the buckling of it produces a deformation of the baffle 24 as shown in FIG. 3. While the spring 32 also appears to be buckled as shown in FIG. 2, it does not exhibit as much force as the spring 30 and does not deform the baffle 26 as shown in FIG. 3.

Figure 4:
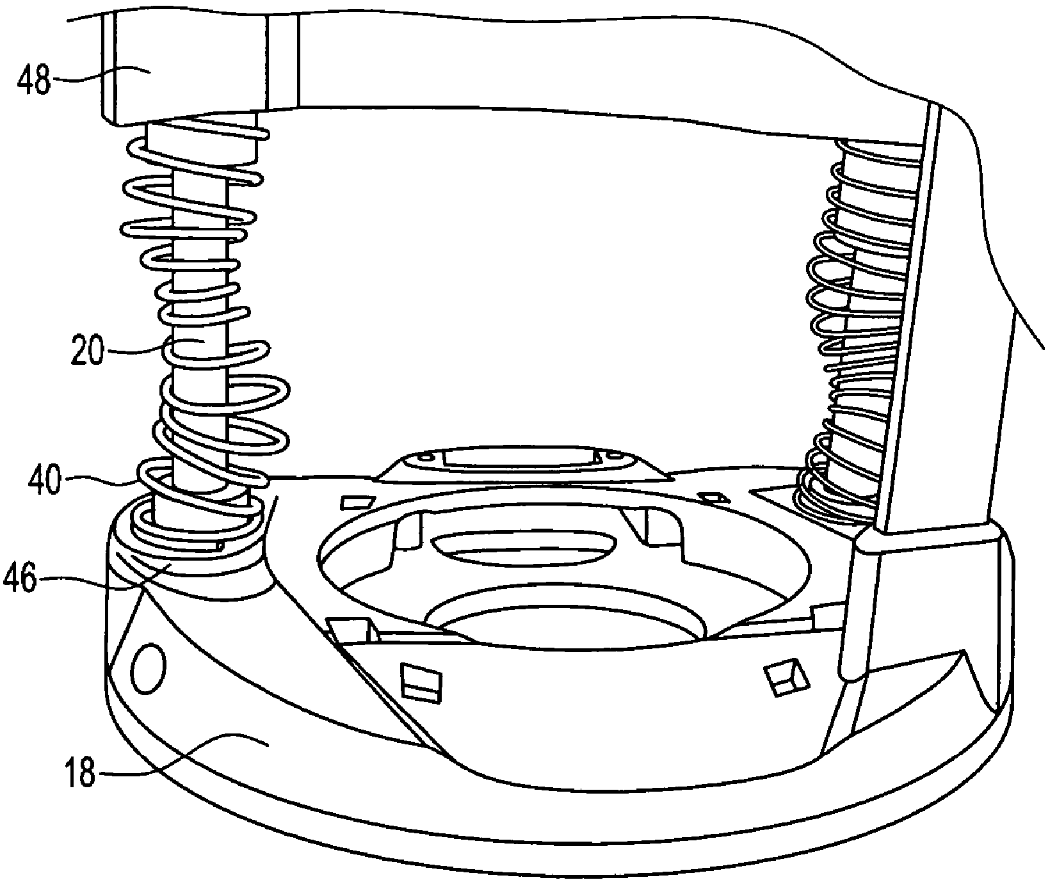
FIG. 4 is a perspective view of a router particularly illustrating a base structure and housing that is slideable on a pair of posts and which illustrates the hourglass configured spring used in the preferred embodiment.
Figure 5:
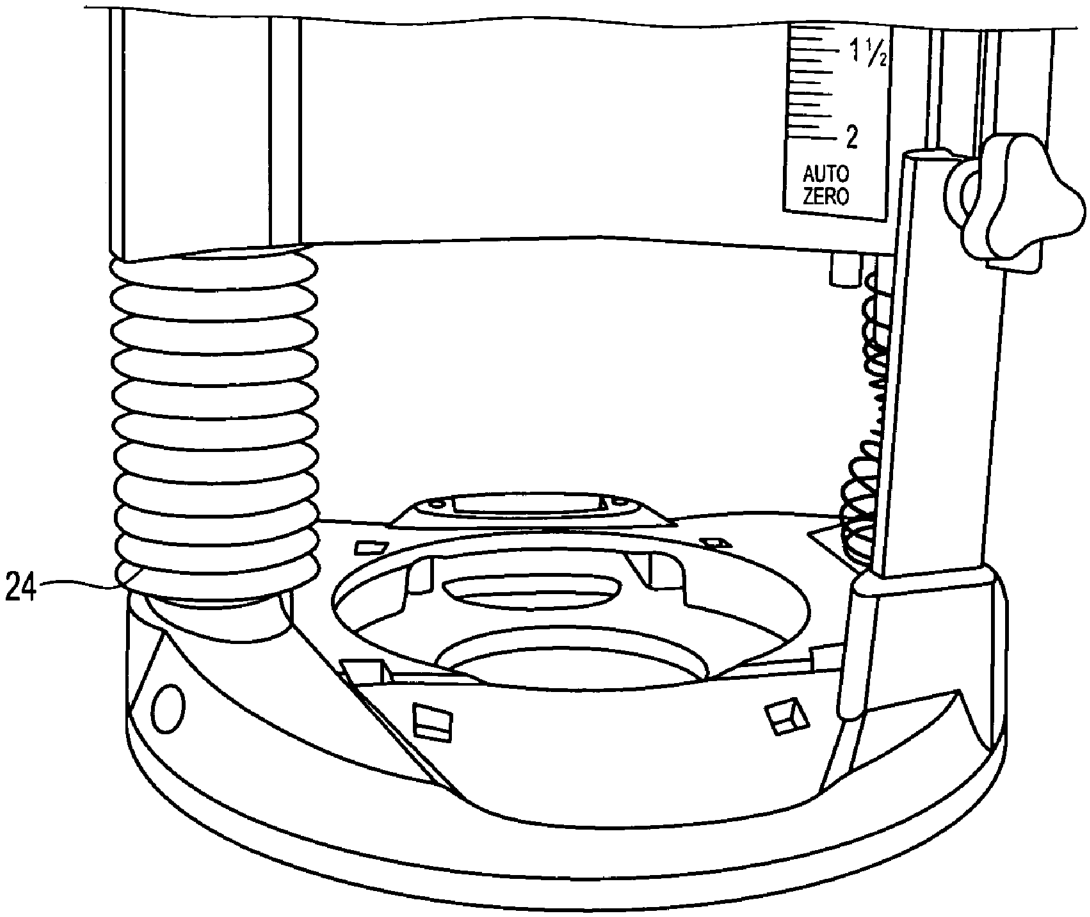
FIG. 5 is a perspective view similar to FIG. 3, but utilizing the hourglass spring of FIG. 6, and particularly showing the absence of deformation of the baffle.
Figure 6:
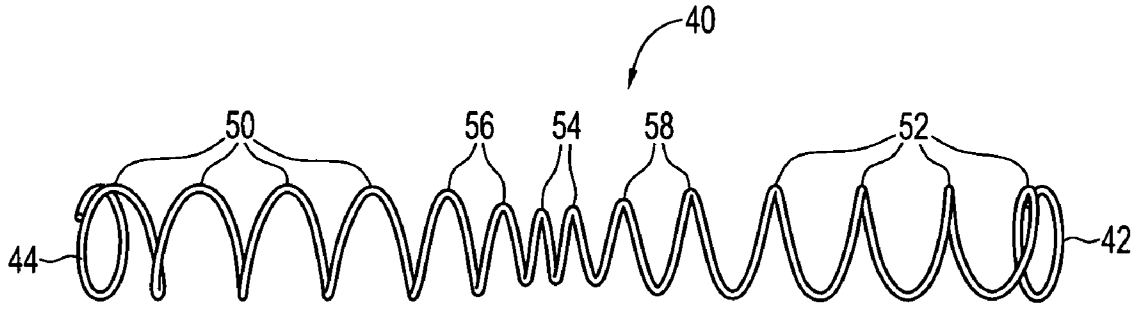
FIG. 6 is a plan view of the hourglass spring that is shown in FIGS. 4 and 5.

In accordance with a preferred embodiment of the present invention and referring to FIGS. 4–6, a spring 40 having an hourglass configuration is employed and installed around the guide post 20. Because of the hourglass configuration, the baffle 24 shown in FIG. 5 has not been noticeably deformed. The reason is that the center portion of the spring 40 is much smaller than the end portions and the center portion is only slightly larger than the post 20, which prevents the spring from buckling in the manner as is shown for the spring 30 in FIG. 2.

With regard to the spring configuration of the preferred embodiment which is shown in its free form in FIG. 6, it preferably has a load characteristic of about 17.5 lbs. at approximately 3½ inches. The spring preferably also has a free length of approximately 7⅛ inches that is comprised of approximately 15¼ coils over its length, with each end being a closed end that is not ground. In other words, the end surfaces of the coils 42 and 44 are generally perpendicular to the axis of the spring so that they are generally flat where they bear upon the upper surface 46 of the base structure 18 and the lower surface 48 of the housing 16. The spring 40 is preferably made from 0.065 inch diameter high carbon spring steel music wire having ASTM AI28 properties. The spring 40 has five portions, a left end portion comprised of four coils 50, a right end portion comprised of four coils 52, a reduced diameter center portion comprised of two coils 54 and two transition portions comprised of two coils 56 and two coils 58 which gradually change from the smaller diameter size coils 54 to the larger diameter end portions 50 and 52. The inside diameter of the end portions 50 and 52 may be different from one another but are preferably approximately equal for the preferred embodiment shown in FIG. 6 and are approximately 0.750 inch. The outside diameter of the small center portion coils 54 is preferably 0.560 inch.

An important consideration in the design of the spring is to provide the necessary spring force but still have the necessary travel. While the spring force can be increased by increasing the diameter of the wire that is used to make the spring, the increased thickness results in a taller solid or compressed height, which reduces the amount of travel that can be accomplished during a plunge operation. In the present design, the diameter of the center portion coils 54 and the transition coils 52 are small enough so that they can collapse into the larger coils 50 and 52 as well as portions of the transition coils 56 and 58. In this manner, the solid height of the compressed spring will be less than would otherwise exist were the coils of uniform diameter. In the preferred embodiment configuration of the spring 40, the approximately 15¼ coils will have a solid height that is equivalent to approximately ten uniform coils having the larger diameter end portions 50, for example. Thus, the hourglass configuration not only prevents spring buckling with its attendant reduction in applied force or at least inconsistent applied force is not only minimized, but the solid height of the hourglass configuration is less than that which would exist were the spring to have a uniform coil diameter.

With regard to the spring 32, it is preferably made of a smaller diameter music wire, namely, approximately 0.29 inch and is preferably made of the same material as the spring 40. It preferably has a free length of approximately 9 inches. A coil outside diameter of approximately 0.843 inch and has a closed end not ground end configuration.

For a totally flat end surface for springs, particularly those which have a larger wire diameter, it is common to grind the end surfaces so that a greater degree of flatness can be achieved at the very end of the wire portion which forms the end coil.

While various embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the following claims.

What is claimed is:

1. A router comprising:

a housing supporting a motor for driving an output shaft to which a bit holding mechanism can be attached, said housing being vertically movable a predetermined maximum distance relative to a base structure;

a base structure having a pair of spaced vertical guide posts along which said housing can be vertically moved;

a flexible baffle configured to vertically expand and contract as the housing is vertically moved relative to said base structure surrounding at least one of said guide posts, said baffle being larger than said guide post to thereby define a space therebetween; and a coil spring located in said space to bias said housing away from said base structure, said spring having an hourglass configuration and being capable of being compressed to permit said housing to move said predetermined maximum distance relative to said base structure.

2. A router as defined in claim 1 wherein said coil spring has a plurality of coils, a first end portion of coils having a first outer diameter, a second end portion of coils having a second outer diameter and a third center portion having a third diameter.

3. A plunge router as defined in claim 2 wherein said first and second diameters are greater than said third diameter.

4. A router as defined in claim 3 wherein said first and second diameters are generally the same size.

5. A router as defined in claim 3 further including a transition portion between said third portion and each of said first and second portions.

6. A router as defined in claim 5 wherein said third portion is capable of telescoping into said first and second portions to reduce the solid height of said coil spring compared to a spring having a uniform diameter of the same size as said first and third portions.

7. A router as defined in claim 6 wherein said spring has a free height of approximately 7.125 inches, is made of 0.065 inches diameter high carbon spring steel music wire having approximately 15.25 coils, with said first and second portions comprising approximately 4 coils, said third portion comprising approximately 2 coils and each of said transition portions comprising approximately 3 coils, said first and second portions having coils with an outer diameter of approximately ¾ inch and said third portion having coils with an inside diameter of approximately 0.56 inches, said approximately 15.25 coils having a solid height of approximately 10 coils as a result of said coils of said third and transition portions telescoping into said first and second end portions.

8. A router as defined in claim 1 further including a second flexible baffle configured to vertically expand and contract as the housing is vertically moved relative to said base structure surrounding said other guide post, said baffle being larger than said other guide post to thereby define a space therebetween; and a second coil spring located in said space to bias said housing away from said base structure, said spring having a uniform outer diameter and being capable of being compressed to permit said housing to move said predetermined maximum distance relative to said base structure.

9. A router as defined in claim 8 wherein said second coil spring has a free height of approximately 9 inches, approximately 21.5 coils, an outsider diameter of approximately 0.84 inches and is made of approximately 0.029 diameter high carbon spring steel music wire.

10. A plunge router comprising:

a housing supporting a motor for driving an output shaft to which a bit holding mechanism can be attached, said housing being vertically movable a predetermined maximum distance relative to a base structure;

a base structure having a pair of spaced vertical guide posts along which said housing can be vertically moved;

a flexible baffle configured to vertically expand and contract as the housing is vertically moved relative to said base structure surrounding each of said guide posts, said baffles being larger than said guide post to thereby define a space therebetween; and first and second coil springs located in said space to bias said housing away from said base structure, said first spring having an hourglass configuration and being capable of being compressed to permit said housing to move said predetermined maximum distance relative to said base structure, said hourglass configuration preventing sufficient deformation of said spring that buckling of said spring can result, which can produce a loss of spring force and deformation of said associated baffle.

11. A plunge router as defined in claim 10 wherein said second spring has a generally uniform outer diameter throughout its length, the spring force of said first spring being greater than the spring force of said second spring.

12. A plunge router as defined in claim 11 wherein the diameter of the material of which said first spring is made is greater than the diameter of the material of which said second spring is made.

13. A plunge router as defined in claim 11 wherein said first spring has a plurality of coils including opposite end portions of coils having a larger outer diameter with the end portions transitioning to a center portion of coils having a smaller coil diameter.

14. A plunge router as defined in claim 13 wherein said center portion coils are capable of collapsing into said opposite end portions to reduce the solid height of said coil spring compared to a spring having a uniform diameter of the same size as said opposite end portions.

* * * * *